(12) United States Patent
Healey et al.

(10) Patent No.: US 10,506,065 B2
(45) Date of Patent: Dec. 10, 2019

(54) TECHNOLOGIES FOR MANAGING SOCIAL RELATIONSHIPS OF A COMPUTING DEVICE SOCIAL GROUP

(71) Applicant: Intel Corporation, Santa Clara, CA (US)

(72) Inventors: Jennifer A. Healey, San Jose, CA (US); Tobias M. Kohlenberg, Portland, OR (US); Dennis M. Morgan, Pine Grove, CA (US); Ramkumar Narayanswamy, Boulder, CO (US)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 14/583,694

(22) Filed: Dec. 27, 2014

(65) Prior Publication Data
US 2016/0191654 A1   Jun. 30, 2016

(51) Int. Cl.
H04L 29/08     (2006.01)
G06F 21/62     (2013.01)

(52) U.S. Cl.
CPC ............ *H04L 67/303* (2013.01); *G06F 21/62* (2013.01); *H04L 67/306* (2013.01)

(58) Field of Classification Search
CPC ..... H04L 67/306; H04L 67/303; H04L 67/42; H04L 51/32; H04L 63/065; G06Q 50/01
USPC ........................................ 709/206, 207, 228
See application file for complete search history.

(56) References Cited

U.S. PATENT DOCUMENTS

| | | | | |
|---|---|---|---|---|
| 5,493,692 A * | 2/1996 | Theimer | ............... | G06Q 10/107 340/5.74 |
| 6,708,203 B1 * | 3/2004 | Makar | ................... | G06F 3/0489 707/999.006 |
| 7,395,507 B2 * | 7/2008 | Robarts | ................. | G06Q 10/10 709/206 |
| 8,307,029 B2 * | 11/2012 | Davis | ................... | G06Q 10/107 455/26.1 |
| 8,799,371 B2 * | 8/2014 | Davis | ................... | G06Q 10/107 709/206 |
| 2003/0078978 A1 * | 4/2003 | Lardin | .................... | H04L 29/06 709/206 |
| 2006/0116142 A1 * | 6/2006 | Cofta | ...................... | H04L 51/24 455/466 |
| 2006/0248573 A1 | 11/2006 | Pannu | | |

(Continued)

FOREIGN PATENT DOCUMENTS

| | | |
|---|---|---|
| EP | 0973296 | 1/2000 |
| JP | 2006-040274 | 2/2006 |

OTHER PUBLICATIONS

U.S. Appl. No. 14/449,937, Davis et al, Vitali Korobov.*

(Continued)

*Primary Examiner* — Hitesh Patel
(74) *Attorney, Agent, or Firm* — Barnes & Thornburg LLP

(57) ABSTRACT

Technologies for managing social relationships of a computing device social group includes exchanging device attributes amongst the members of the computing device social group, determining a social relationship between members, and sharing a social interaction policy based on the social relationship. The social interaction policy and the social relationship are used to define and control interactions of members of the computing device social group.

24 Claims, 6 Drawing Sheets

(56) References Cited

U.S. PATENT DOCUMENTS

| | | | | |
|---|---|---|---|---|
| 2007/0155411 A1* | 7/2007 | Morrison | | H04M 3/493 |
| | | | | 455/466 |
| 2007/0161382 A1* | 7/2007 | Melinger | | H04L 67/18 |
| | | | | 455/456.1 |
| 2007/0162569 A1* | 7/2007 | Robinson | | H04L 12/1818 |
| | | | | 709/219 |
| 2008/0070697 A1* | 3/2008 | Robinson | | A63F 13/12 |
| | | | | 463/42 |
| 2008/0086431 A1* | 4/2008 | Robinson | | A63F 13/12 |
| | | | | 706/11 |
| 2008/0086458 A1* | 4/2008 | Robinson | | A63F 13/12 |
| 2008/0120390 A1* | 5/2008 | Robinson | | A63F 13/12 |
| | | | | 709/207 |
| 2010/0306276 A1* | 12/2010 | Davis | | G06F 17/30525 |
| | | | | 707/803 |
| 2011/0153746 A1* | 6/2011 | Callanan | | H04L 12/1827 |
| | | | | 709/205 |
| 2012/0066037 A1* | 3/2012 | Glen | | G06F 21/6263 |
| | | | | 705/14.4 |
| 2012/0233652 A1* | 9/2012 | Drope | | G06F 21/10 |
| | | | | 725/114 |
| 2014/0007190 A1* | 1/2014 | Alperovitch | | G06Q 50/01 |
| | | | | 726/3 |
| 2014/0156856 A1 | 6/2014 | Marce | | |
| 2015/0236866 A1* | 8/2015 | Colby | | H04L 12/1822 |
| | | | | 709/205 |

OTHER PUBLICATIONS

International Search Report for PCT/US15/061876, dated Apr. 19, 2016 (3 pages).
Written Opinion for PCT/US15/061876, dated Apr. 19, 2016 (8 pages).
Extended European search report dated Jul. 23, 2018 for European Patent Application No. 15873953.2-1213, 7 pages.

* cited by examiner

TECHNOLOGIES FOR MANAGING SOCIAL RELATIONSHIPS OF A COMPUTING DEVICE SOCIAL GROUP

BACKGROUND

Computing devices are quickly becoming ubiquitous tools for many users. In fact, the number of smart devices owned by a user or with which the user interacts on a daily basis is ever increasing. With the explosion in numbers of computing devices, many of which are configured to communicate with each other, managing the operation, privileges, and actions of one's computing devices is becoming complex and overly difficult for the average user. Further, the average user may not have the time or technical know-how to manage the behavior policies of their computing devices.

Oftentimes hard-coded or pre-defined policies are relied on by a user due to the difficulty of managing the array of computing devices and the time required to perform such maintenance. However, the hard-coded/pre-defined behavior policies of a typical computing device may not be suitable for the environment in which the user will use the computing device. For example, such behavior policies may not function well and/or function in unanticipated ways within the user's home network of computing devices. Additionally, the user may have custom policies in place, which require the reprogramming of the computing device. For example, if an old computing device is replaced with a newer model, the user would be required to re-instantiate the custom policies into the newer model. Such managing of computing devices is burdensome and often leads to failure to manage the policies, which can result in security or privacy concerns.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
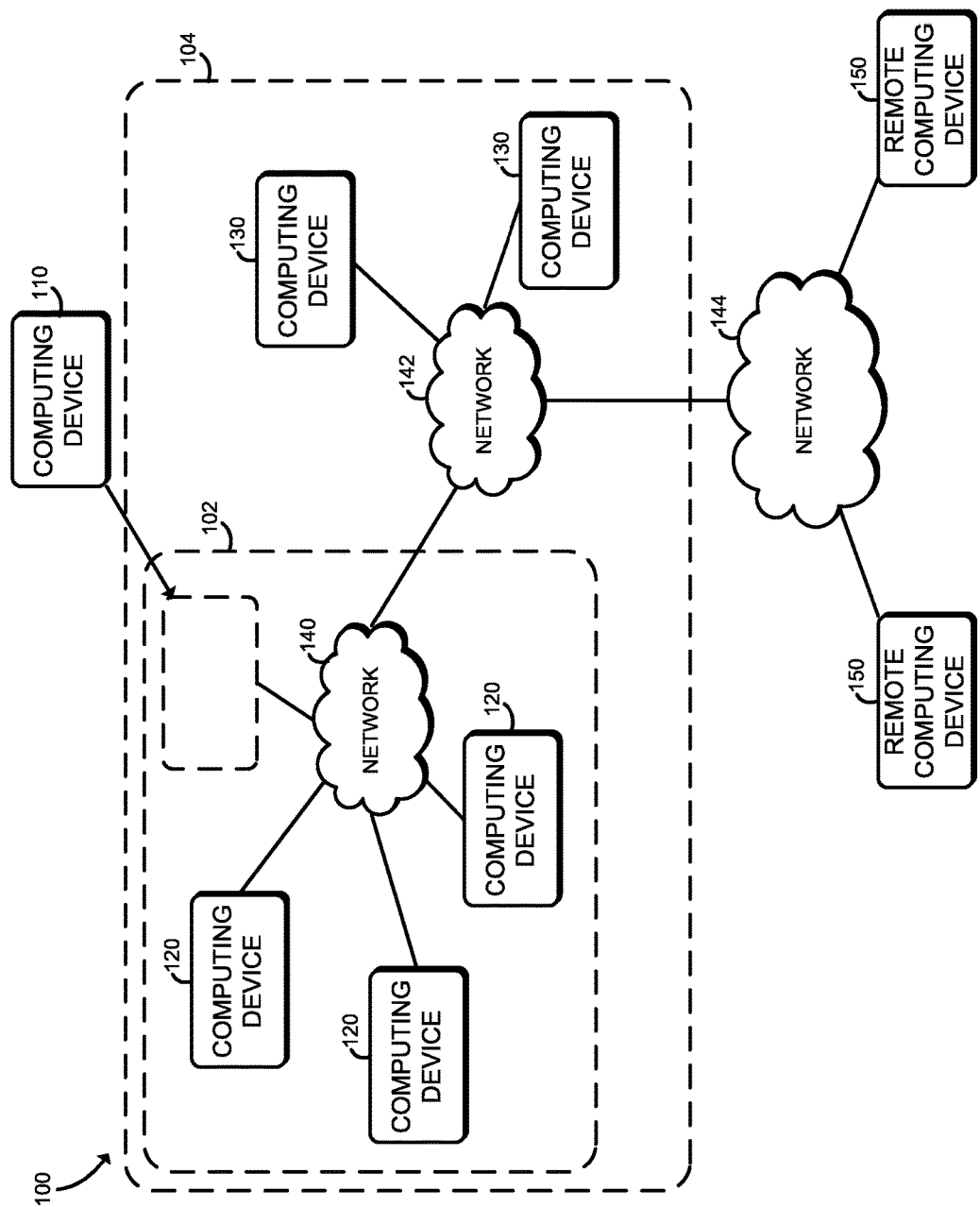
FIG. 1 is a simplified diagram of at least one embodiment of a system for managing social relationships of computing device social groups.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for managing social relationships between computing devices of computing device social groups includes a group of computing devices 120, each of which belong to an established computing device social group 102. Additionally, as illustratively shown in FIG. 1, each of the computing devices 120 also belong to a computing device social group 104, along with computing devices 130. Each of the computing device social groups 102, 104 define a set of corresponding computing devices 120, 130 that share common attributes and have established a group social interaction policy amongst themselves. As discussed in more detail below, the group social interaction policy defines how the various computing devices 120, 130 of a particular computing device social group 102, 104 interact with each other. The common attributes on which a computing device social group is based may be embodied as any type of attribute useable to establish commonality between the group members. For example, the attributes may include physical characteristics such as make, model, or type of the computing device, proximity characteristics such as co-location or the length of time a computing device has been present, activity characteristics such as the function of the computing device, historical interactions with other group members, or interactions with other computing devices, and/or other characteristics of the individual computing devices.

As discussed above, each computing device social group 102, 104 maintains a group social interaction policy that defines rules for interacting with members of the computing device social group 102, 104 (e.g., the social "norms" of the social group). In some embodiments, each member of a computing device social group 102, 104 may maintain a copy of the group social interaction policy, as well as a local social interaction policy. The local social interaction policy may be embodied as a group social interaction policy that has been modified based on the attributes or requirements of the particular computing device 120, 130.

Each member of a computing device social group 102, 104 also maintains a social relationship with other members of the computing device social group 102, 104. Each social relationship may be defined by various parameters such as a social relationship trust parameter indicative how amount much trust one member has in another member and a social relationship strength parameter indicative of how much one member "likes" another member, which may define actions that the member will perform for the other member as discussed below.

Each computing device social group 102, 104 of the system 100 is substantially self-maintaining based on a sharing of the group social interaction policy as discussed in more detail below. Some of the computing devices 120, 130 of a computing device social group 102, 104 may be identified as advisor computing devices capable of initializing new members to the social group 102, 104. In some embodiments, each computing device 120, 130 of a computing device social group 102, 104 may act as an advisor computing device; however, in other embodiments the advisor computing devices of the particular computing device social group 102, 104 may be pre-determined or based on particular criteria (e.g., the "oldest" member of the group, the member with the greatest amount of knowledge of social interactions, etc.). New members to a computing device social group 102, 103 may communicate with the advisor computing device to obtain copies of the group social interaction policy and build social relationships with the advisor computing device and other members of the computing device social group 102, 103. For example, as shown in FIG. 1, a new member computing device 110 is in the process of joining the computing device social group 102. To do so, the new member computing device 110 may interact with an advisor computing device 120 of the computing device social group 102 to establish an initial group social interaction policy and social relationships (see, e.g., FIG. 2). As discussed in more detail below, the social nature of the computing device social groups 102, 104 facilitate the sharing of group policies or norms, social relationships, and other data.

Illustratively, each of the computing devices 120 may communicate with other members of the computing device social group 102 via a local network 140 and/or with members of the social group 104 via a local network 142. Additionally, each of the computing devices 120, 130 may communicate with remote computing devices 150 over a network 144. Each of the networks 140, 142, 144 may be embodied as any type of communication network capable of facilitating communications between the computing devices 120, 130, 150. As such, the networks 140, 142, 144 may include one or more networks, routers, switches, computers, and/or other intervening devices. For example, the network 140, 142, 144 may be embodied as or otherwise include one or more local or wide area networks, cellular networks, publicly available global networks (e.g., the Internet), an ad hoc network, a short-range communication network or link, or any combination thereof.

It should be appreciated that although the illustrative system 100 includes only two computing device social groups 102, 104, the system 100 may include any number of computing device social groups in other embodiments. Additionally, each computing device social group of the system 100 may include any number of computing devices (e.g., two or more).

Figure 2:
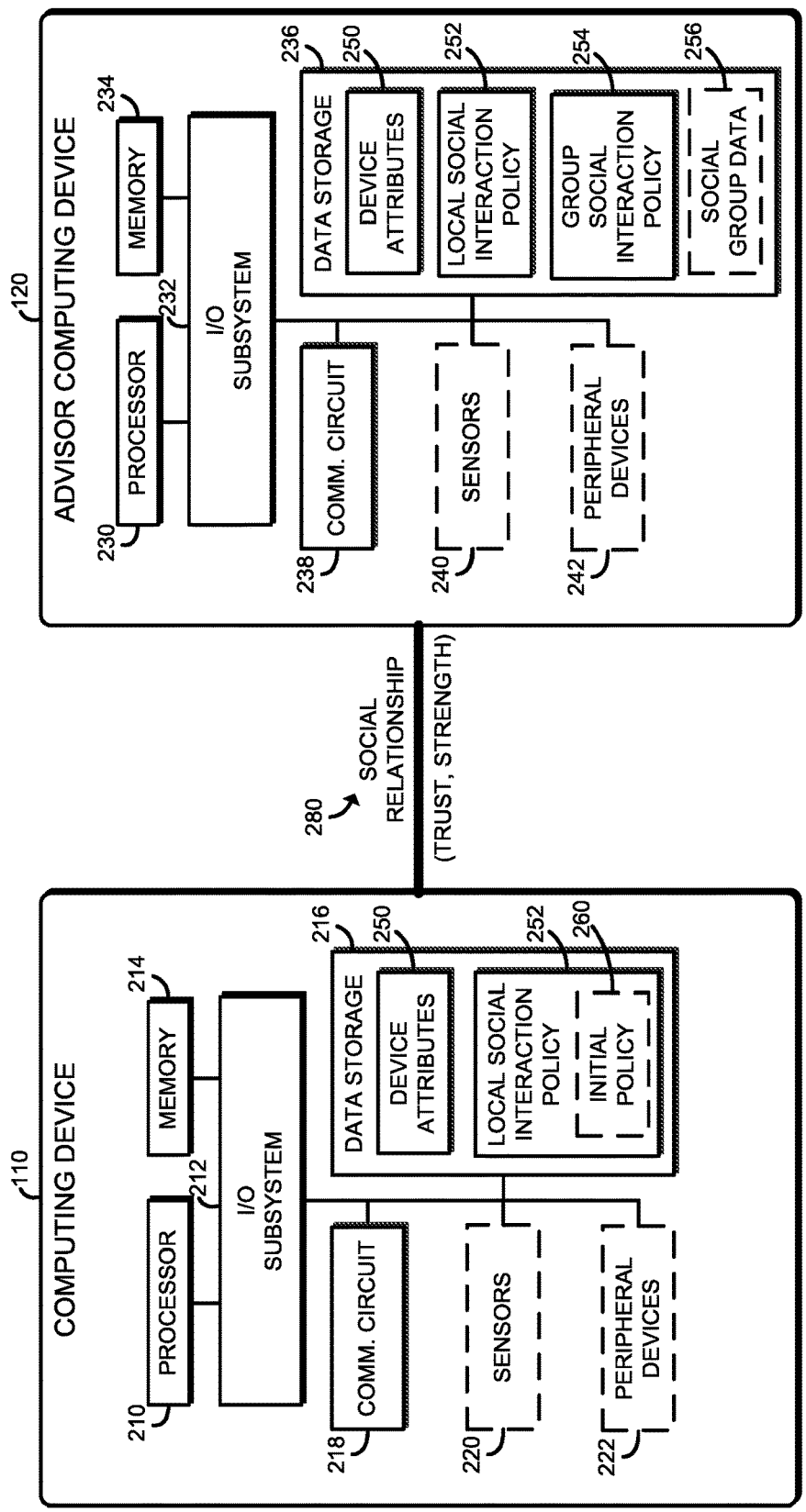
FIG. 2 is a simplified block diagram of a new member computing device and an advisor computing device of a social group of the system of FIG. 1.

Referring now to FIG. 2, an illustrative new member computing device 110 and an illustrative advisor computing device 120 of the computing device social group 102 is shown. Each of the computing devices 110, 120 and other computing devices of the system 100 may be embodied as any type of computing device capable of communicating with other members of a computing device social group and performing the functions described herein. For example, each computing device 110, 120 may be embodied as any type of computing device including, but not limited to, a mobile or stationary computer, a smart device, a smart phone, a smart accessory, a smart watch, a smart wallet, a smart tool, smart keys, smart glasses, smart dishware, a smart appliance, a vehicle computer, a head-mounted display unit, a tablet computer, a notebook computer, a laptop computer, a cellular telephone, a handset, a messaging device, a multiprocessor system, a processor-based system, a consumer electronic device, and/or any other computing device capable of communicating with other members of a computing device social group. In some embodiments the computing devices 110, 120 may be embodied as smart devices having limited or no user interface through which a user may configured or program the computing device 110, 120.

As shown in FIG. 1, the illustrative computing device 110 includes a processor 210, an I/O subsystem 212, a memory 214, a data storage 216, and a communication circuit 218. Of course, the computing device 110 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 214, or portions thereof, may be incorporated in the processor 210 in some embodiments The processor 210 may be embodied as any type of processor capable of performing the functions described herein. For example, the processor 210 may be embodied as a single or multi-core processor(s), a single or multi-socket processor, a digital signal processor, a microcontroller, or other processor or processing/controlling circuit. Similarly, the memory 214 may be embodied as any type of volatile or non-volatile memory or data storage capable of performing the functions described herein. In operation, the memory 214 may store various data and software used during operation of the computing device 110 such as operating systems, applications, programs, libraries, and drivers. The memory 214 is communicatively coupled to the processor 210 via the I/O subsystem 212, which may be embodied as circuitry and/or components to facilitate input/output operations with the processor 210, the memory 214, and other components of the computing device 110. For example, the I/O subsystem 212 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 212 may form a portion of a system-on-a-chip (SoC) and be incorporated, along with the processor 210, the memory 214, and other components of the computing device 110, on a single integrated circuit chip.

The data storage 216 may be embodied as any type of device or devices configured for the short-term or long-term storage of data. For example, the data storage 216 may include any one or more memory devices and circuits, memory cards, hard disk drives, solid-state drives, or other data storage devices. Illustratively, the data storage 216 stores device attributes 250, which define various characteristics of the computing device 110. The device attributes 250 may be embodied as any type of characteristic of the computing device 110 from which an amount of trustworthiness may be determined. For example, the device attributes 250 may define physical characteristics (make, model, type, processor power, memory capacity, storage capacity, communication bandwidth, etc.), persistency characteristics (e.g., the devices proximity, how long the device has been in communication with the social group, etc.), historical interaction characteristics (e.g., interactions with members of the group or other groups), and/or any other characteristic of the computing device 110 that maybe used to determine a similarity with other computing devices.

The data storage 216 may also include a local social interaction policy 252. As discussed above, the local social interaction policy 252 defines a set of rules controlling the interactions and behavior of the computing device 110. Oftentimes, the local social interaction policy 252 of a computing device may be similar to or identical to the group social interaction policy 254. However, as discussed above, individual computing devices of a computing device social group may modify or add to the group social interaction policy as needed. Additionally, in some embodiments, a new member of a computing device social group may include an initial policy 260, which is used by the computing device 110 to control initial interactions with group members prior to receiving the group social interaction policy from an advisor computing device.

The communication circuit 218 may be embodied as any communication circuit, device, or collection thereof, capable of enabling communications between the computing device 110 and other computing devices of the computing device social group. To do so, the communication circuit 218 may be configured to use any one or more communication technology and associated protocols (e.g., Ethernet, Bluetooth®, Wi-Fi®, WiMAX, etc.) to effect such communication.

In some embodiments, the computing device 110 may include one or more sensors 220 for sensing various stimuli and generating sensor data indicative thereof. If the computing device 110 is a member of a computing device social group, the computing device 110 may share the sensor data according to the group social interaction policy 254 and the social relationship established with the receiving computing device. Additionally, in some embodiments, the computing device 110 may further include one or more peripheral devices 222. The peripheral devices 222 may include any type of peripheral device commonly found in a computer device, for example, a display, a hardware keyboard, input/output devices, peripheral communication devices, and/or other peripheral devices.

The advisor computing device 120 may be substantially similar to or different from the computing device 110, but share common attributes as discussed above. As shown in FIG. 2, the illustrative computing device 120 includes a processor 230, an I/O subsystem 232, a memory 234, a data storage 236, a communication circuit 238, and may include sensors 240, and peripheral devices 242. Of course, the computing device 110 may include other or additional components, such as those commonly found in a computer (e.g., various input/output devices), in other embodiments. Each of the components of the advisor computing device 120 may be substantially similar to corresponding components of the computing device 110 (e.g., the processor 230 may be similar to the processor 210, etc.), the description of which is equally applicable to the components of the advisor computing device 120 and are not repeated herein for clarity of the description.

Similar to the computing device 110, the data storage 236 of the advisor computing device 120 includes device attributes 250 and a local social interaction policy 252. As discussed above, the device attributes 250 of the computing device 120 define various characteristics of the computing device 120. Again, the device attributes 250 may be embodied as any type of characteristic of the computing device 120 from which an amount of trustworthiness may be determined. For example, the device attributes 250 may define physical characteristics, persistency characteristics, historical interaction characteristics, and/or any other characteristic of the computing device 120 that may be used to determine a trustworthiness of the computing device 120.

The data storage 236 also stores a local social interaction policy 252 of the advisor computing device 120. Again, as discussed above, the local social interaction policy 252 defines a set of rules controlling the interactions and behavior of the computing device 120. Because the advisor computing device 120 is illustratively an active member of the computing device social group 102, the advisor computing device 120 also includes a copy of the group social interaction policy 254. The group social interaction policy 254 defines a set of global rules for controlling interactions and activity of members of the computing device social group 102. As discussed above, in some embodiments, the local social interaction policy 252 of a computing device may be identical to, similar to, or a modified version of the group social interaction policy 254. Further, in some embodiments, the advisor computing device 120 also stores social group data 256 in the data storage 236. The social group data 256 is embodied as raw group data that may be indicative of group interactions, rules, policies, historical data, or any other type of data based on the computing device social group and from which the computing device 110 may determine or infer a local social interaction policy. For example, in some embodiments, the computing device 110 may implement a machine learning algorithm to determine its local social interaction policy using the social group data as initial training set data.

As discussed above, each of the computing devices of a computing device social group establish a social relationship between each other. As shown in FIG. 2, the new member computing device 110 and the advisor computing device 120 have established a social relationship 280. Illustratively, the social relationship 280 includes a trust parameter and a strength parameter. The trust parameter defines how much trust the computing device 110 has in the data received from the advisor computing device 120 and vice-versa, and the strength parameter defines how much the computing device 110 and the advisor computing device 120 "like" each other, which defines the type of actions and/or response each device 110, 120 will perform for each other. Although the social relationship 280 is shown in FIG. 2 as a two-way relationship, it should be appreciated that a social relationship between two members of a computing device social group may be one-way. That is, each member may have a social relationship with another member having different trust and strength parameters. Additionally, the social relationship 280 between two members of a computing device social group may change, modify, or be updated over time based on various criteria such as changes in the computing device member's device attributes, activity, or persistency.

Figure 3:
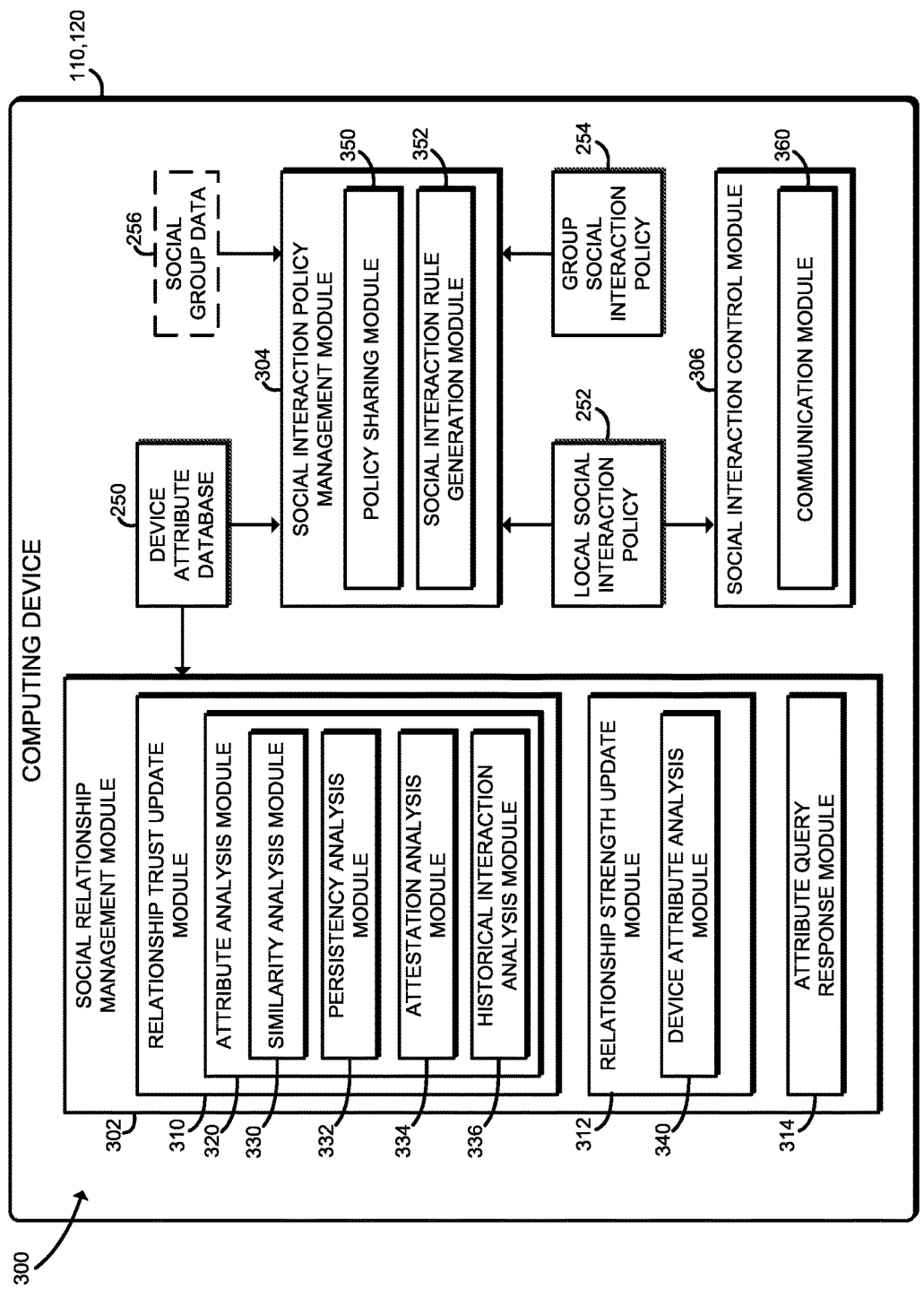
FIG. 3 is a simplified block diagram of an environment that may be established by the new member computing device and/or the advisor computing device of FIG. 2.

Referring now to FIG. 3, in use, each computing device 110, 120 may establish an environment 300. The illustrative environment 300 includes a social relationship management module 302, a social interaction policy management module 304, and a social interaction control module 306. Each of the modules and other components of the environment 300 may be embodied as firmware, software, hardware, or a combination thereof. For example the various modules, logic, and other components of the environment 300 may form a portion of, or otherwise be established by, the processor 210, 230, the I/O subsystem 212, 232, an SoC, or other hardware components of the computing device 110, 120. As such, in some embodiments, any one or more of the modules of the environment 300 may be embodied as a circuit or collection of electrical devices (e.g., a social relationship management circuit, a social interaction policy management circuit, and a social interaction control circuit, etc.).

The social relationship management module 302 includes a relationship trust update module 310 and a relationship strength update module 312. As discussed above, the social relationship between two members of a computing device social group may be defined by various parameters, such as a trust parameter and a strength parameter. Additionally, the social relationship parameters may change over time as discussed above. As such, the relationship trust update module 310 is configured to establish and update the trust parameter of a social relationship of the computing device 110, 120. To do so, the relationship trust update module 310 includes an attribute analysis module 320 configured to obtain device attributes of another member of the computing device social group and determine the level of trust in the social relationship based on the device attributes.

For example, the attribute analysis module 320 may include a similarity analysis module 330 that analyzes the device attributes of the other computing device 110, 120 to determine an amount of similarity between the two computing device 110, 120. For example, the similarity analysis module 330 may analyze device attributes indicative of physical characteristics of the other computing device 110, 120 (e.g., are the devices of the same type, from the same manufacturer, perform similar functions, located on the same network, etc.). The determination of the similarity analysis module 330 may positively or negatively affect the relationship trust parameter of the social relationship with the other computing device 110, 120. For example, a determination that the other computing device 110, 120 has the same manufacturer may increase the level of trust the computing device 110, 120 has for the other computing device 110, 120.

The attribute analysis module 320 may also include a persistency analysis module 332 that analyzes device attributes of the other computing device 110, 120 to determine an amount of persistency of the other computing device 110, 120. The measured persistency may be embodied as any type of persistency characteristic such physical proximity (e.g., how long the other computing device 110, 120 has been close by to the computing device 110, 120 based on, for example, global positioning system data, indoor positioning location data, wireless receive signal strength indication, etc.), architectural persistency (e.g., how long have the computing devices 110, 120 been on the same network, shared similar IP addresses, etc.), persistency in data exchanged between devices, persistency of IP or other address, or other data indicative of a persistency characteristic. Again, the determination of the persistency analysis module 332 may positively or negatively affect the relationship trust parameter of the social relationship with the other computing device 110, 120.

The attribute analysis module 320 may also include an attestation analysis module 334, which evaluates any attestations for the other computing device 110, 120 received from other members of the computing device social group 102. For example, if the other computing device 110, 120 is introduced to a computing device 110, 120 by a trusted member of the computing device social group 102, the computing device 110, 120 may establish a higher level of trust for the other computing device 110, 120.

The attribute analysis module 320 may also include a historical interaction analysis module 336, which analyzes historical behavior and interactions of the other computing device 110, 120. Such historical behaviors and interactions may include evaluation of data previously shared by the other computing device 110, 120 (e.g., was the data accurate or useful), has the other computing device 110, 120 repeatedly abided by or violated the group social interaction policy 254, has the other computing device 110, 120 behaved in a predictable manner (e.g., has the other computing device 110, 120 behaved according to a manner predicated by the computing device 110, 120, etc.). Again, the determination of the historical interaction analysis module 336 may positively or negatively affect the relationship trust parameter of the social relationship with the other computing device 110, 120.

Of course, it should be appreciated that the attribute analysis module 320 may analyze other types of device attributes, characteristics, qualities, or other data about the other computing device 110, 120 to establish the trust parameter of a social relationship with the other computing device 110, 120. Additionally, as discussed in more detail below, the computing device 110, 120 may continually update the trust parameter based on an updated analysis of the device attributes.

As discussed above, the social relationship management module 302 also includes the relationship strength update module 312. The relationship strength update module 312 is configured to establish and update a strength parameter of a social relationship of the computing device 110, 120. The strength parameter is an indication of how much the computing device 110, 120 "likes" or responds to the other computing device 110, 120. In practical terms, the strength parameter defines the types and quality of actions the computing device 110, 120 will perform for the other computing device 110, 120. For example, if the other computing device 110, 120 requests the computing device 110, 120 to reduce bandwidth consumption, the computing device 110, 120 may satisfy that request, to varying degrees, if the strength of the social relationship between the computing device s110, 110 is high. Alternatively, the computing device 110, 120 may ignore the request, respond more slowly, or respond with a reduced effect if the strength of the social relationship between the computing devices is low. The relationship strength update module 312 includes a device attribute analysis module 340, similar to the analysis attribute module 320 of the relationship trust update module 310. The device attribute analysis module 340 analyzes the device attributes of the other computing device 110, 120 to determine and update the strength parameter of the social relationship. The device attribute analysis module 340 may include similar sub-modules, and perform in a similar manner, as described above for the attribute analysis module 320. For example, the device attribute analysis module 340 may include a similarity analysis module 330, a persistency analysis module 332, an attestation analysis module 334, and/or a historical interaction analysis module 336.

The relationship trust update module 310 may also include an attribute query response module 314. The attribute query response module 314 is configured to respond to attribute requests from other computing device 110, 120. To do so, the attribute query response module 314 may retrieve and transmit the device attributes of the computing device 110, 120 from the device attribute database 250.

The social interaction policy management module 304 of the environment 300 is configured to manage the global and/or local social interaction policies 252, 254 stored on the computing device 110, 120. For example, the social interaction policy management module 304 includes a policy sharing module 350 to facilitate the sharing of the group social interaction policy 254 and/or its own local social interaction policy 252. As discussed above, the computing device 110, 120 may act as an advisor computing device for new members and share the group social interaction policy (or portions thereof) based on the device attributes and/or social relationship established with new members.

In some embodiments, the social interaction policy management module 304 may also include a social interaction rule generation module 352. The social interaction rule generation module 352 is configured to modify, update, or generate rules included in the group social interaction policy 254 and/or the local social interaction policy 252 of the computing device 110, 120. For example, as discussed above, the computing device 110, 120 may receive raw social group data 256 and utilize the social group data 256 to infer or generate social interaction rules using machine learning algorithms or the like. Such generated social interaction rules may be add to the group social interaction policy 254 (e.g., by majority vote or via another mechanism).

The social interaction control module 306 is configured to control the interactions of the computing device 110, 120 according to its local social interaction policy 252, which is identical to or based on the group social interaction policy 254. To do so, the social interaction control module 306 may control a communication module 360 of the computing device 110, 120 to ensure the computing device 110, 120 behaves according to the social interaction policy 252, 254.

Figure 4:
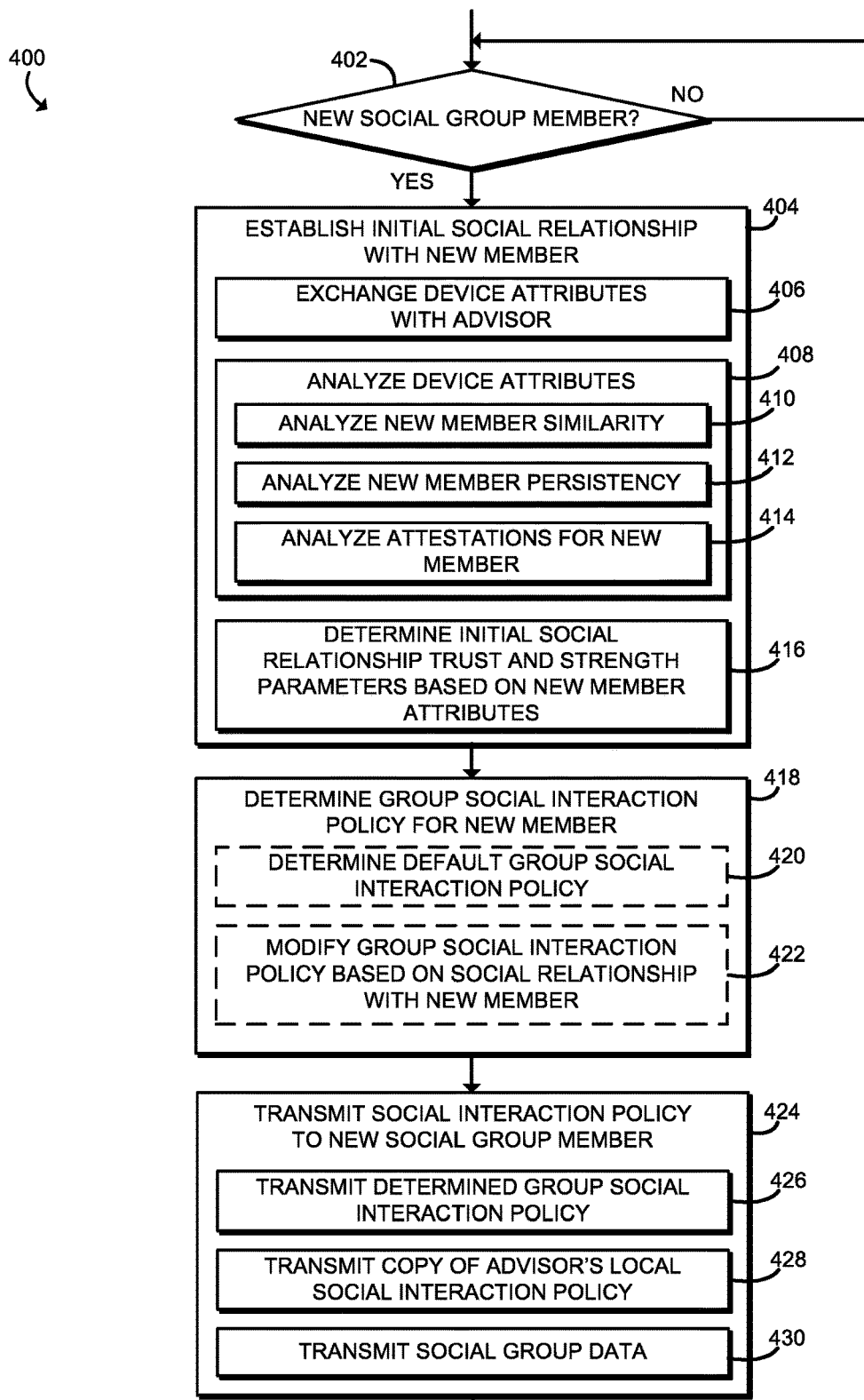
FIG. 4 is a simplified flow diagram of a method for establishing a social interaction policy for a new group member that may be executed by the advisor computing device of FIGS. 2 and 3.

Referring now to FIG. 4, in use, an advisor computing device 120 may execute a method 400 for establishing a social interaction policy for a new member computing device 110 of the computing device social group 102. The method 400 begins with block 402 in which the advisor computing device 120 determines whether a new member computing device 110 has joined the computing device social group 102. To do so, the advisor computing device 120 may receive a request from the new member computing device 110, broadcast its services, or otherwise identify a new member computing device 110 based on the behavior of the new member computing device 110 (e.g., is the new member computing device 110 behaving according to the group social interaction policy 254).

If the advisor computing device 120 detects a new group member, the method 400 advances to block 404 in which the advisor computing device 120 establishes an initial social relationship with the new member computing device 110. To do so, the advisor computing device 120 may exchange device attributes with the new member computing device 110 in block 406. In some embodiments, the advisor computing device 120 may request the new member computing device 110 provide its device attributes before providing the device attributes of the advisor computing device 120 (e.g., to determine whether the new member computing device 110 is acceptable for the computing device social group 102). In block 408, the advisor computing device 120 analyses the device attributes of the new member computing device 110. As discussed above, the advisor computing device 120 may analyze any device attribute of the new member computing device 110 useful in establishing an initial trust parameter of the social relationship with the new member computing device 110. For example, in block 410, the advisor computing device 120 may analyze the device attributes of the new member computing device 110 to determine an amount of similarity between the advisor computing device 120 and the new member computing device 110. Additionally, in block 412, the advisor computing device 120 may analyze the device attributes of the new member computing device 110 to determine an amount of amount of persistency of the new member computing device 110. Further, in block 414, the advisor computing device 120 may analyze any attestations for the new member computing device 110 received from other members of the computing device social group 102. Regardless of the particular device attributes analyzed, the advisor computing device 120 generates an initial social relationship trust and an initial social relationship strength for the social relationship with the new member computing device 110 in block 416.

After the advisor computing device 120 has established the initial social relationship with the new member computing device 110, the method 400 advances to block 418 in which the advisor computing device 120 determines a social group interaction policy for the new member computing device 110. To do so, in some embodiments, the advisor computing device 120 may select the default or existing group social interaction policy 254 (i.e., the social group interaction policy 254 used by typical group member). Alternatively, in some embodiments, the advisor computing device 120 may modify the social group interaction policy 254 based on the established social relationship with the new member computing device 110. For example, if the trust parameter of the social relationship is weak (e.g., the new member computing device 110 is very dissimilar from the advisor computing device 120), the advisor computing device 120 may modify the social group interaction policy 254 (e.g., by removing group privileges, adding more stringent requirements, etc.). In this way, the advisor computing device 120 may modify the expected "norms" of the new member computing device 110 based on the trustworthiness of the new member computing device 110. Overtime, a the new member computing device 110 builds additional trust, the advisor computing device 120 may update the social interaction policy of the new member computing device 110.

In block 424, the advisor computing device 120 transmits the social interaction policy to the new member computing device 110. To do so, in block 426, the advisor computing device 120 transmits the social interaction policy determined in block 418. Alternatively, the advisor computing device 120 may transmit its own local social interaction policy in block 428. For example, if the advisor computing device 120 determines that the new member computing device 110 is very similar to the advisor computing device 120 (e.g., the same type of device from the same manufacturer) or has a high level of trust in the new member computing device 110, the advisor computing device 120 may transmit its own local social interaction policy to the new member computing device 110. Alternatively or additionally, the advisor computing device 120 may transmit the social group data in block 430. As discussed above, the social group data 256 is embodied as raw group data that may be indicative of group interactions, rules, policies, historical data, or any other type of data based on the computing device social group and from which the computing device 110 may determine or infer a local social interaction policy (e.g., via use of a machine learning algorithm). In this way, an advisor computing device 120 may initialize a new member computing device 110 of the computing device social group 102 with the group social interaction policy to control the behavior of the new member.

Figure 5:
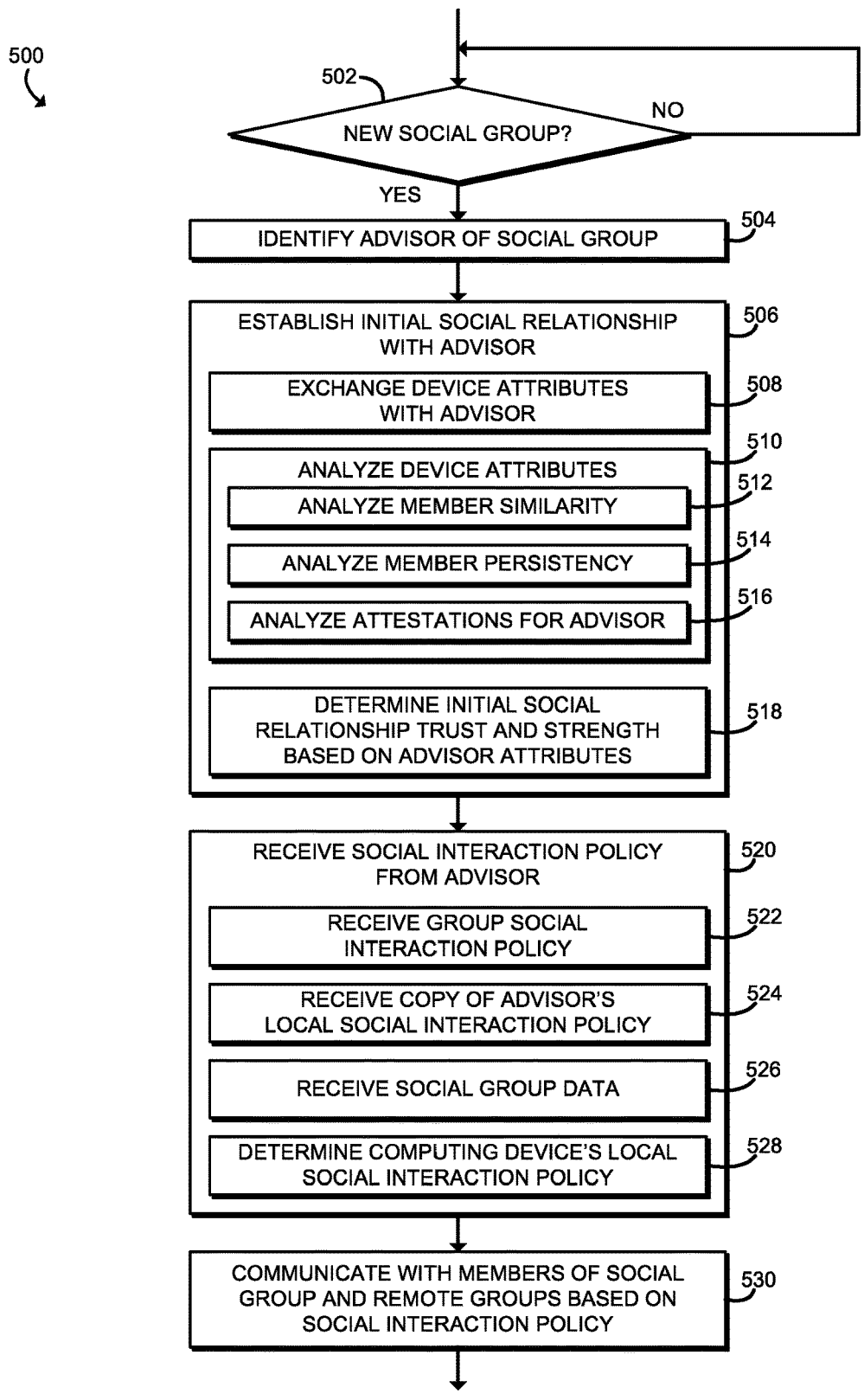
FIG. 5 is a simplified flow diagram of a method for establishing a social interaction policy that may be executed by the new member computing device of FIGS. 2 and 3.

Referring now to FIG. 5, in use, a new member computing device 110 may execute a method 500 for establishing a social interaction policy. The method begins with block 502 in which the computing device 110 determines whether to join a new social group. If so, the method 500 advances to block 504 in which the new member computing device 110 identifies an advisor computing device 120 from the group members. As discussed above, each computing device 120 of the computing device social group 102 may be an advisor in some embodiments. In other embodiments, the advisors of the computing device social group 102 may broadcast messages introducing themselves as advisors for the computing device social group 102. Further, the new member computing device 110 may broadcast requests for an advisor.

Regardless, once the new member computing device 110 identifies an advisor computing device 120, the method 500 advances to block 506 in which the computing device 110 establishes an initial social relationship with the advisor computing device 120. To do so, the computing device 110 may exchange device attributes with the advisor computing device 120 in block 408. In block 510, the computing device 110 analyses the device attributes of the advisor computing device 120. For example, similar to advisor computing device 120 discussed above, the computing device 110 may analyze the device attributes of the advisor computing device 120 to determine an amount of similarity between computing device 110 and the advisor computing device 120 in block 512. Additionally, in block 514, the computing device 110 may analyze the device attributes of the advisor computing device 120 to determine an amount of amount of persistency of the advisor computing device 120. Further, in block 516, the computing device 110 may analyze any attestations for the advisor computing device 120 received from other members of the computing device social group 102. Regardless of the particular device attributes analyzed, the computing device 110 generates an initial social relationship trust and an initial social relationship strength for the social relationship with the advisor computing device 120 in block 518.

In block 520, the computing device 110 receives a social interaction policy from the advisor computing device 120. For example, the computing device 110 may receive the social group interaction policy from the advisor computing device 120 in block 422 or receive a copy of the advisor computing device's 120 local social interaction policy in block 524. Additionally or alternatively, the computing device 110 may receive the social group raw data in block 526. In such embodiments, the computing device 110 may determine a local social interaction policy based on the social group raw data (e.g., based on a machine learning algorithm).

Once the new member computing device 110 has established an initial social interaction policy, the computing device beings communicating with members of the computing device social group 102 and remote groups 104 based on its local social interaction policy, which may be the same as the group social interaction policy or a modification thereof as discussed above.

Figure 6:
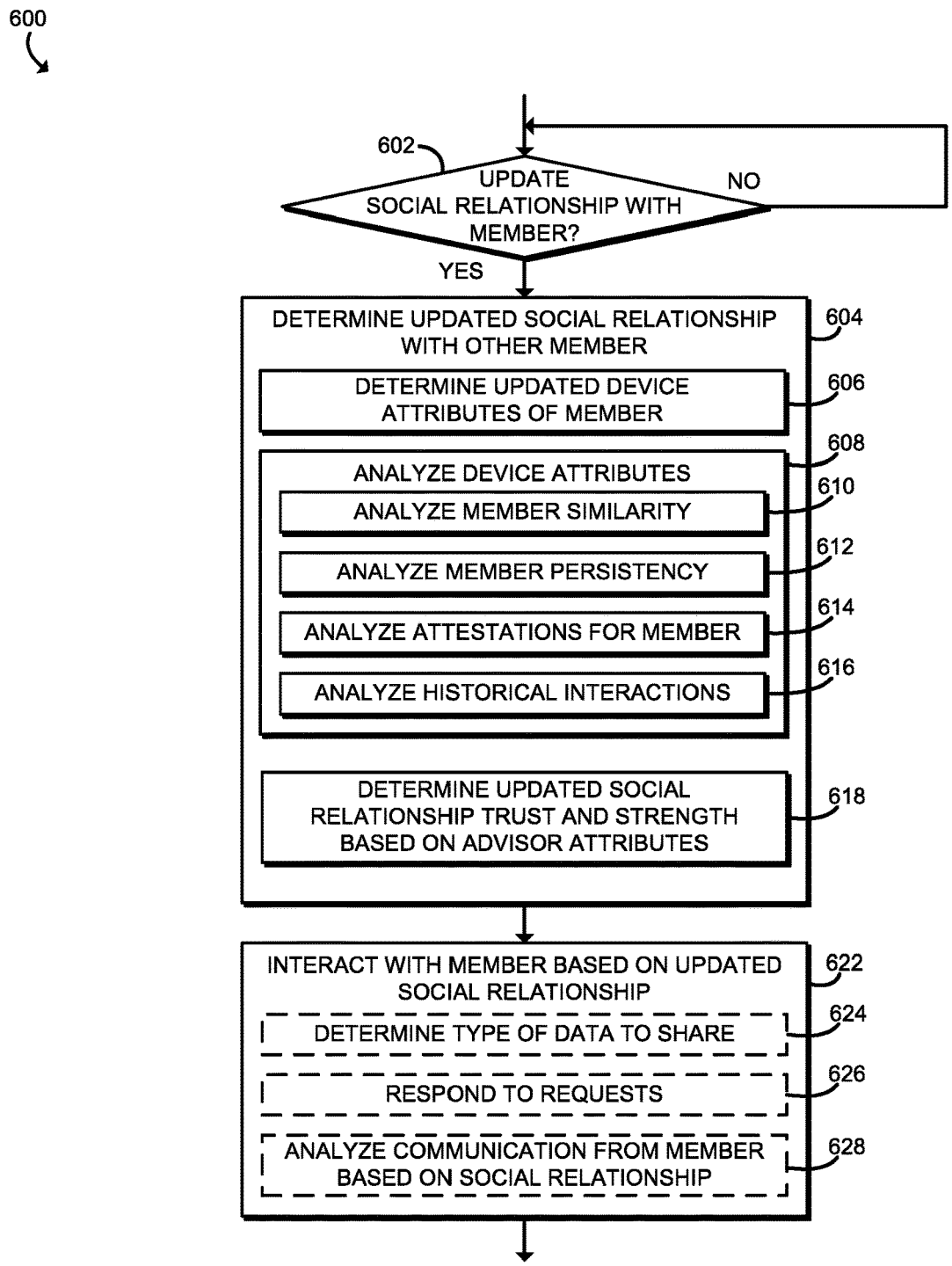
FIG. 6 is a simplified flow diagram of a method for updating social relationships that may be executed by a computing device of a computing device social group of FIG. 1.

Referring now to FIG. 6, in use, each of the computing devices 110, 120 of the computing device social group 102 (or other group) may execute a method 600 for updating social relationships. The method 600 begins with block 602 in which the computing device 110, 120 determines whether to update a social relationship established with a fellow member of a computing device social group. If so, the method 600 advances to block 604 in which the computing device 110, 120 determines an updated social relationship trust parameter. To do so, the computing device 110, 120 may obtain updated device attributes from the other member in block 606. In block 608, the computing device 110, 120 analyzes the updated device attributes. For example, the computing device 110, 120 may analyze the device attributes of the other member to determine an amount of similarity between computing device 110, 120 and the other member in block 610. Additionally, in block 612, the computing device 110, 120 may analyze the device attributes of the other member to determine an amount of persistency of the other member. Further, in block 614, the computing device 110, 120 may analyze any attestations for the other member received from additional members of the computing device social group 102. Additionally, in block 616, the computing device 110, 120 may analyze any historical interactions of the other member. For example, the computing device 110, 120 may analyze interactions of the other member with members of the computing device social group 102, analyze the behavior of the other member relative to the group social interaction policy, analyze interactions of the other member with members of other social groups, and/or other interaction activities of the other member. Regardless of the particular device attributes analyzed, the computing device 110, 120 generates an updated social relationship trust and an updated social relationship strength for the social relationship with the other member in block 618.

Subsequently, in block 620, the computing device 110, 120 interacts with the other member based on the updated social relationship (e.g., based on the updated social relationship trust and strength). For example, in block 624, the computing device 110, 120 may determine the type of data to share with the other member based on the social relationship in block 624. In block 626, the computing device 110, 120 may respond to requests from the other member based on the social relationship with the member (e.g., to perform or not perform the request). Additionally, in block 628, the computing device 110, 120 may analyze communications from the other member based on the social relationship with the member.

Accordingly, using the technologies disclosed herein, members of a computing device social group may establish, update, and maintain social relationships amongst themselves. Additionally, the members of the computing device social group may establish and manage the norms or expected social behavior of group members.

EXAMPLES

Illustrative examples of the devices, systems, and methods disclosed herein are provided below. An embodiment of the devices, systems, and methods may include any one or more, and any combination of, the examples described below.

Example 1 includes a computing device member of a computing device social group, the computing device member comprising a social relationship management module to (i) exchange device attributes with another computing device member of the computing device social group, wherein the device attributes define at least a physical characteristic of the associated computing device and (ii) determine parameters of a social relationship with the another computing device member based on the device attributes of the another computing device member, wherein the parameters define at least an amount of trust of the another computing device member by the computing device member; and a social interaction policy management module to (i) receive a social interaction policy from the another computing device member based on the device attributes of the computing device member, wherein the social interaction policy defines rules for interacting with members of the computing device social group, and (ii) determine a local social interaction policy based on the social interaction policy received from the another computing device and the social relationship established with the another computing device; and a social interaction control module to control interactions with computing device members of the computing device social group based on the local social interaction policy.

Example 2 includes the subject matter of Example 1, and wherein the device attributes are usable to determine an amount of similarity between the computing device member and the another computing device member.

Example 3 includes the subject matter of any of Examples 1 and 2, and wherein the device attributes comprise an attestation from a different computing device member of the computing device social group for the computing device member or the another computing device member.

Example 4 includes the subject matter of any of Examples 1-3, and wherein the device attributes define a temporal persistency of the computing device member or the another computing device member with the computing device social group.

Example 5 includes the subject matter of any of Examples 1-4, and wherein the device attributes define historical interactions of the computing device member or the another computing device member with other computing device members of the computing device social group.

Example 6 includes the subject matter of any of Examples 1-5, and wherein to determine parameters of the social relationship comprises to determine a strength parameter of the social relationship, wherein the strength parameter dictates which actions the computing device member will perform for the another computing device.

Example 7 includes the subject matter of any of Examples 1-6, and wherein to receive the social interaction policy comprises to receive a group social interaction policy for the computing device social group; and determine the local social interaction policy based on the received group social interaction policy.

Example 8 includes the subject matter of any of Examples 1-7, and wherein to receive the social interaction policy comprises to receive, from the another computing device member, a local social interaction policy of the another computing device member based on a similarity of device attributes between the another computing device member and the computing device member; and determine the local social interaction policy based on the local social interaction policy of the another computing device member.

Example 9 includes the subject matter of any of Examples 1-8, and wherein to receive the social interaction policy comprises to receive, from the another computing device member, a social group data indicative of interactions of members of the computing device social group; and determine the local social interaction policy based on the received social group data.

Example 10 includes the subject matter of any of Examples 1-9, and wherein to control interactions with the computing device members based on the social interaction policy comprises to determine a type of data to share with a member of the computing device social group based on the local social interaction policy.

Example 11 includes the subject matter of any of Examples 1-10, and wherein to control interactions with the computing device members based on the social interaction policy comprises to respond to requests received from a member of the computing device social group based on the social local interaction policy.

Example 12 includes the subject matter of any of Examples 1-11, and wherein the social relationship management module is further to determine whether to update the social relationship established with the another computing device member; obtain, in response to a determination to update the social relationship, updated device attributes of the another computing device member, wherein the updated device attributes define at least a physical characteristic of the another computing device; and re-determine the parameters of the social relationship with the another computing device based on the updated device attributes.

Example 13 includes the subject matter of any of Examples 1-12, and wherein the updated device attributes defines an amount of similarity between the computing device member and the another computing device member.

Example 14 includes the subject matter of any of Examples 1-13, and wherein the updated device attributes comprise an attestation from a different computing device member of the computing device social group for the another computing device member.

Example 15 includes the subject matter of any of Examples 1-14, and wherein the updated device attributes define a temporal persistency of the another computing device member with the computing device social group.

Example 16 includes the subject matter of any of Examples 1-15, and wherein the updated device attributes define historical interactions of the another computing device member with the computing device member.

Example 17 includes the subject matter of any of Examples 1-16, and wherein to re-determine parameters of the social relationship comprises to re-determine a strength parameter of the social relationship based on at least one of the updated device attributes or historical interactions with the another computing device member, wherein the strength parameter dictates which actions the computing device member will perform for the another computing device.

Example 18 includes the subject matter of any of Examples 1-17, and wherein to control interactions with the computing device members comprises to control interactions with the another computing device member based on the local social interaction policy and the social relationship established with the another computing device.

Example 19 includes the subject matter of any of Examples 1-18, and wherein to control interactions with the another computing device member comprises to determine a type of data to share with the another computing device member based on the social relationship established with the another computing device member.

Example 20 includes the subject matter of any of Examples 1-19, and wherein to control interactions with the another computing device member comprises to respond to requests received from the another computing device member based on the social relationship established with the another computing device member.

Example 21 includes a computing device member of a computing device social group, the computing device member comprising a social relationship management module to (i) receive device attributes from a new computing device member of the computing device social group, wherein the device attributes define at least a physical characteristic of the new computing device member and (ii) determine parameters of a social relationship with the new computing device member based on the device attributes, wherein the parameters define at least an amount of trust of the new computing device member by the computing device member; and a social interaction policy management module to (i) determine a social interaction policy for the new computing device member based on the social relationship with the new computing device member, wherein the social interaction policy defines rules for interacting with members of the computing device social group and (ii) transmit the determined social interaction policy to the new computing device member.

Example 22 includes the subject matter of Example 21, and wherein the device attributes defines an amount of similarity between the computing device member and the new computing device member.

Example 23 includes the subject matter of any of Examples 21 and 22, and wherein the device attributes comprise an attestation from a different computing device member of the computing device social group for the new computing device member.

Example 24 includes the subject matter of any of Examples 21-23, and wherein the updated device attributes define a temporal persistency of the new computing device member with the computing device social group.

Example 25 includes the subject matter of any of Examples 21-24, and wherein the updated device attributes define historical interactions of the new computing device member with the computing device member.

Example 26 includes the subject matter of any of Examples 21-25, and wherein to determine parameters of the social relationship comprise to determine a strength parameter of the social relationship, wherein the strength parameter dictates which actions the computing device member will perform for the new computing device.

Example 27 includes the subject matter of any of Examples 21-26, and wherein the social interaction policy comprises a default social interaction policy.

Example 28 includes the subject matter of any of Examples 21-27, and wherein to determine the social interaction policy comprises to determine the social interaction policy from a group social interaction policy based on the social relationship with the new computing device member.

Example 29 includes the subject matter of any of Examples 21-28, and wherein to determine the social interaction policy comprises to determine social group data indicative of interactions of members of the computing device social group.

Example 30 includes the subject matter of any of Examples 21-29, and wherein social relationship management module is further to determine whether to update the social relationship established with the new computing device member; obtain, in response to a determination to update the social relationship, updated device attributes of the new computing device member, wherein the updated device attributes define at least a physical characteristic of the new computing device; and re-determine the parameters of the social relationship with the new computing device member based on the updated device attributes.

Example 31 includes the subject matter of any of Examples 21-30, and further including a social interaction control module to control interactions with the new computing device member based on the social relationship with the new computing device member Example 32 includes the subject matter of any of Examples 21-31, and, wherein to control interactions with the new computing device member comprises to determine a type of data to share with the new computing device member based on the social relationship established with the new computing device member.

Example 33 includes the subject matter of any of Examples 21-32, and wherein to control interactions with the new computing device member comprises to respond to requests received from the new computing device member based on the social relationship established with the new computing device member.

Example 34 includes a method for managing social relationships of a computing device social group, the method comprising exchanging, by a computing device member of the computing device social group, device attributes with another computing device member of the computing device social group, wherein the device attributes define at least a physical characteristic of the associated computing device; determining, by the computing device member, parameters of a social relationship with the another computing device member based on the device attributes of the another computing device member, wherein the parameters define at least an amount of trust of the another computing device member by the computing device member; receiving, by the computing device member, a social interaction policy from the another computing device member based on the device attributes of the computing device member, wherein the social interaction policy defines rules for interacting with members of the computing device social group; determining, by the computing device member, a local social interaction policy based on the social interaction policy received from the another computing device and the social relationship established with the another computing device; interacting, by the computing device member, with computing device members of the computing device social group based on the local social interaction policy.

Example 35 includes the subject matter of Example 34, and wherein the device attributes are usable to determine an amount of similarity between the computing device member and the another computing device member.

Example 36 includes the subject matter of any of Examples 34 and 35, and wherein the device attributes comprise an attestation from a different computing device member of the computing device social group for the computing device member or the another computing device member.

Example 37 includes the subject matter of any of Examples 34-36, and wherein the device attributes define a temporal persistency of the computing device member or the another computing device member with the computing device social group.

Example 38 includes the subject matter of any of Examples 34-37, and wherein the device attributes define historical interactions of the computing device member or the another computing device member with other computing device members of the computing device social group.

Example 39 includes the subject matter of any of Examples 34-38, and wherein determining parameters of the social relationship includes determining a strength parameter of the social relationship, wherein the strength parameter dictates which actions the computing device member will perform for the another computing device.

Example 40 includes the subject matter of any of Examples 34-39, and wherein receiving the social interaction policy comprises receiving, from the another computing device member, a group social interaction policy for the computing device social group; and determining the local social interaction policy based on the received group social interaction policy.

Example 41 includes the subject matter of any of Examples 34-40, and wherein receiving the social interaction policy comprises receiving, from the another computing device member, a local social interaction policy of the another computing device member based on a similarity of device attributes between the another computing device member and the computing device member; and determining the local social interaction policy based on the local social interaction policy of the another computing device member.

Example 42 includes the subject matter of any of Examples 34-41, and wherein receiving the social interaction policy comprises receiving, from the another computing device member, a social group data indicative of interactions of members of the computing device social group; and determining the local social interaction policy based on the received social group data.

Example 43 includes the subject matter of any of Examples 34-42, and wherein interacting with the computing device members based on the social interaction policy comprises determining a type of data to share with a member of the computing device social group based on the local social interaction policy.

Example 44 includes the subject matter of any of Examples 34-43, and wherein interacting with the computing device members based on the social interaction policy comprises responding to requests received from a member of the computing device social group based on the social local interaction policy.

Example 45 includes the subject matter of any of Examples 34-44, and further including determining, by the computing device member, whether to update the social relationship established with the another computing device member; obtaining, by the computing device member and in response to a determination to update the social relationship, updated device attributes of the another computing device member, wherein the updated device attributes define at least a physical characteristic of the another computing device; and re-determining the parameters of the social relationship with the another computing device based on the updated device attributes.

Example 46 includes the subject matter of any of Examples 34-45, and wherein the updated device attributes defines an amount of similarity between the computing device member and the another computing device member.

Example 47 includes the subject matter of any of Examples 34-46, and wherein the updated device attributes comprise an attestation from a different computing device member of the computing device social group for the another computing device member.

Example 48 includes the subject matter of any of Examples 34-47, and wherein the updated device attributes define a temporal persistency of the another computing device member with the computing device social group.

Example 49 includes the subject matter of any of Examples 34-48, and wherein the updated device attributes define historical interactions of the another computing device member with the computing device member.

Example 50 includes the subject matter of any of Examples 34-49, and wherein re-determining parameters of the social relationship includes determining a strength parameter of the social relationship based on at least one of the updated device attributes or historical interactions with the another computing device member, wherein the strength parameter dictates which actions the computing device member will perform for the another computing device.

Example 51 includes the subject matter of any of Examples 34-50, and wherein interacting with computing device members of the computing device social group comprises interacting with the another computing device member based on the local social interaction policy and the social relationship established with the another computing device.

Example 52 includes the subject matter of any of Examples 34-51, and wherein interacting with the another computing device member comprises determining a type of data to share with the another computing device member based on the social relationship established with the another computing device member.

Example 53 includes the subject matter of any of Examples 34-52, and wherein interacting with the another computing device member comprises responding to requests received from the another computing device member based on the social relationship established with the another computing device member.

Example 54 includes a method for managing social relationships with a member of a computing device social group, the method comprising receiving, by a computing device member of the computing device social group, device attributes of a new computing device member of the computing device social group, wherein the device attributes define at least a physical characteristic of the new computing device member; determining, by the computing device member, parameters of a social relationship with the new computing device member based on the device attributes, wherein the parameters define at least an amount of trust of the new computing device member by the computing device member; determining, by the computing device member, a social interaction policy for the new computing device member based on the social relationship with the new computing device member, wherein the social interaction policy defines rules for interacting with members of the computing device social group; and transmitting the determined social interaction policy to the new computing device member.

Example 55 includes the subject matter of Example 54, and wherein the device attributes defines an amount of similarity between the computing device member and the new computing device member.

Example 56 includes the subject matter of any of Examples 54 and 55, and wherein the device attributes comprise an attestation from a different computing device member of the computing device social group for the new computing device member.

Example 57 includes the subject matter of any of Examples 54-56, and wherein the updated device attributes define a temporal persistency of the new computing device member with the computing device social group.

Example 58 includes the subject matter of any of Examples 54-57, and wherein the updated device attributes define historical interactions of the new computing device member with the computing device member.

Example 59 includes the subject matter of any of Examples 54-58, and wherein determining parameters of the social relationship includes determining a strength parameter of the social relationship, wherein the strength parameter dictates which actions the computing device member will perform for the new computing device.

Example 60 includes the subject matter of any of Examples 54-59, and wherein determining the social interaction policy comprises determining a default social interaction policy.

Example 61 includes the subject matter of any of Examples 54-60, and wherein determining the social interaction policy comprises determining the social interaction policy from a group social interaction policy based on the social relationship with the new computing device member.

Example 62 includes the subject matter of any of Examples 54-61, and wherein determining the social interaction policy comprises determining social group data indicative of interactions of members of the computing device social group.

Example 63 includes the subject matter of any of Examples 54-62, and further including determining, by the computing device member, whether to update the social relationship established with the new computing device member; obtaining, by the computing device member and in response to a determination to update the social relationship, updated device attributes of the new computing device member, wherein the updated device attributes define at least a physical characteristic of the new computing device; and re-determining the parameters of the social relationship with the new computing device member based on the updated device attributes.

Example 64 includes the subject matter of any of Examples 54-63, and further including interacting with the new computing device member based on the social relationship with the new computing device member Example 65 includes the subject matter of any of Examples 54-64, and wherein interacting with the new computing device member comprises determining a type of data to share with the new computing device member based on the social relationship established with the new computing device member.

Example 66 includes the subject matter of any of Examples 54-65, and wherein interacting with the new computing device member comprises responding to requests received from the new computing device member based on the social relationship established with the new computing device member.

Example 67 includes one or more computer-readable storage media comprising a plurality of instructions stored thereon that, in response to execution, cause a computing device to perform the method of any of Examples 34-66.

Example 68 includes a computing device member of a computing device social group, the computing device comprising means for performing the method of any of Examples 34-66.

The invention claimed is:

1. A computing device member of a computing device social group, the computing device member comprising:
a processor; and
a memory coupled to the processor and having stored therein a plurality of instructions that, when executed, cause the computing device member to:
exchange device attributes with another computing device member of the computing device social group, wherein the device attributes define at least a physical characteristic of the associated computing device,
determine parameters of a social relationship with the another computing device member based on the device attributes of the another computing device member, wherein the parameters include a trust parameter indicative of an amount of trust of the another computing device member by the computing device member,
receive a social interaction policy from the another computing device member that is based on the device attributes of the computing device member, wherein the social interaction policy defines rules for interacting with computing devices that are already members of the computing device social group,
determine a local social interaction policy based on the social interaction policy received from the another computing device member and the social relationship established with the another computing device member, wherein the local social interaction policy is different from the social interaction policy by at least a single rule,
control interactions with computing device members of the computing device social group based on the local social interaction policy and the trust parameter;
determine whether to update the social relationship established with the another computing device member;
analyze, in response to a determination to update the social relationship, historical interactions with the another computing device member to determine a behavior of the another computing device member as a function of compliance with one or more rules defined by the social interaction policy; and
adjust the trust parameter of the social relationship with the another computing device based on the behavior.

2. The computing device member of claim 1, wherein the device attributes (i) are usable to determine an amount of similarity between the computing device member and the another computing device member, (ii) comprise an attestation from a different computing device member of the computing device social group for the computing device member or the another computing device member, (iii) define a temporal persistency of the computing device member or the another computing device member with the computing device social group, or (iv) define historical interactions of the computing device member or the another computing device member with other computing device members of the computing device social group.

3. The computing device member of claim 1, wherein to determine parameters of the social relationship comprises to determine a strength parameter of the social relationship, wherein the strength parameter dictates which actions the computing device member will perform for the another computing device.

4. The computing device member of claim 1, wherein to receive the social interaction policy comprises to:

receive, from the another computing device member, a local social interaction policy of the another computing device member based on a similarity of device attributes between the another computing device member and the computing device member; and determine the local social interaction policy based on the local social interaction policy of the another computing device member.

5. The computing device member of claim 1, wherein to receive the social interaction policy comprises to:

receive, from the another computing device member, a social group data indicative of interactions of members of the computing device social group; and determine the local social interaction policy based on the received social group data.

6. The computing device member of claim 1, wherein the plurality of instructions, when executed, further cause the computing device to:

determine whether to update the social relationship established with the another computing device member;

obtain, in response to a determination to update the social relationship, updated device attributes of the another computing device member, wherein the updated device attributes define at least a physical characteristic of the another computing device; and re-determine the parameters of the social relationship with the another computing device based on the updated device attributes.

7. The computing device member of claim 1, wherein to determine the parameters of the social relationship with the another computing device member based on the device attributes of the another computing device member comprises to determine the parameters of the social networking relationship with the another computing device member based on the physical characteristic of the another computing device member.

8. The computing device member of claim 1, wherein to determine the local social interaction policy comprises to modify the social interaction policy based on the social relationship established with the another computing device.

9. A computing device member of a computing device social group, the computing device member comprising:

a processor; and a memory coupled to the processor and having stored therein a plurality of instructions that, when executed, cause the computing device member to:

receive device attributes from a new computing device member of the computing device social group, wherein the device attributes define at least a physical characteristic of the new computing device member, determine parameters of a social relationship with the new computing device member that is based on the device attributes, wherein the parameters include a trust parameter indicative of an amount of trust of the new computing device member by the computing device member, determine a social interaction policy for the new computing device member based on the social relationship with the new computing device member, wherein the social interaction policy defines rules for interacting with computing devices that are already members of the computing device social group, wherein the local social interaction policy is different from the social interaction policy by at least a single rule, transmit the determined social interaction policy to the new computing device member and the trust parameter;

determine whether to update the social relationship established with the new computing device member;

analyze, in response to a determination to update the social relationship, historical interactions with the new computing device member to determine a behavior of the new computing device member as a function of compliance with one or more rules defined by the social interaction policy; and adjust the trust parameter of the social relationship with the new computing device based on the behavior.

10. The computing device member of claim 9, wherein the device attributes (i) defines an amount of similarity between the computing device member and the new computing device member, (ii) comprise an attestation from a different computing device member of the computing device social group for the new computing device member, (iii) define a temporal persistency of the new computing device member with the computing device social group, or (iv) define historical interactions of the new computing device member with the computing device member.

11. The computing device member of claim 9, wherein the plurality of instructions, when executed, further cause the computing device to:

determine whether to update the social relationship established with the new computing device member;

obtain, in response to a determination to update the social relationship, updated device attributes of the new computing device member, wherein the updated device attributes define at least a physical characteristic of the new computing device; and re-determine the parameters of the social relationship with the new computing device member based on the updated device attributes.

12. The computing device member of claim 9, wherein the plurality of instructions, when executed, further cause the computing device to control interactions with the new computing device member based on the social relationship with the new computing device member.

13. One or more non-transitory, computer-readable storage media comprising a plurality of instructions stored thereon that, in response to execution, cause a computing device of a computing device social group to:

exchange device attributes with another computing device member of the computing device social group, wherein the device attributes define at least a physical characteristic of the associated computing device;

determine parameters of a social relationship with the another computing device member based on the device attributes of the another computing device member, wherein the parameters includes a trust parameter indicative of an amount of trust of the another computing device member by the computing device member;

receive a social interaction policy from the another computing device member that is based on the device attributes of the computing device member, wherein the social interaction policy defines rules for interacting with computing devices that are already members of the computing device social group;

determine a local social interaction policy based on the social interaction policy received from the another computing device member and the social relationship established with the another computing device member, wherein the local social interaction policy is different from the social interaction policy by at least a single rule;

interact with computing device members of the computing device social group based on the local social interaction policy and the trust parameter;

determine whether to update the social relationship established with the another computing device member;

analyze, in response to a determination to update the social relationship, historical interactions with the another computing device member to determine a behavior of the another computing device member as a function of compliance with one or more rules defined by the social interaction policy; and adjust the trust parameter of the social relationship with the another computing device based on the behavior.

14. The one or more non-transitory, computer-readable storage media of claim 13, wherein the device attributes (i) are usable to determine an amount of similarity between the computing device member and the another computing device member, (ii) comprise an attestation from a different computing device member of the computing device social group for the computing device member or the another computing device member, (iii) define a temporal persistency of the computing device member or the another computing device member with the computing device social group, or (iv) define historical interactions of the computing device member or the another computing device member with other computing device members of the computing device social group.

15. The one or more non-transitory, computer-readable storage media of claim 13, wherein to determine parameters of the social relationship includes to determine a strength parameter of the social relationship, wherein the strength parameter dictates which actions the computing device member will perform for the another computing device.

16. The one or more non-transitory, computer-readable storage media of claim 13, wherein to receive the social interaction policy comprises to:
receive, from the another computing device member, a group social interaction policy for the computing device social group; and
determine the local social interaction policy based on the received group social interaction policy.

17. The one or more non-transitory, computer-readable storage media of claim 13, wherein to receive the social interaction policy comprises to:
receive, from the another computing device member, a local social interaction policy of the another computing device member based on a similarity of device attributes between the another computing device member and the computing device member; and
determine the local social interaction policy based on the local social interaction policy of the another computing device member.

18. The one or more non-transitory, computer-readable storage media of claim 13, wherein to receive the social interaction policy comprises to:
receive, from the another computing device member, a social group data indicative of interactions of members of the computing device social group; and
determine the local social interaction policy based on the received social group data.

19. The one or more non-transitory, computer-readable storage media of claim 13, wherein to interact with the computing device members based on the social interaction policy comprises to determine a type of data to share with a member of the computing device social group based on the local social interaction policy.

20. The one or more non-transitory, computer-readable storage media of claim 13, wherein to interact with the computing device members based on the social interaction policy comprises to respond to requests received from a member of the computing device social group based on the social local interaction policy.

21. The one or more non-transitory, computer-readable storage media of claim 13, wherein the plurality of instructions further cause the computing device to:
determine whether to update the social relationship established with the another computing device member;
obtain, in response to a determination to update the social relationship, updated device attributes of the another computing device member, wherein the updated device attributes define at least a physical characteristic of the another computing device; and
re-determine the parameters of the social relationship with the another computing device based on the updated device attributes.

22. One or more non-transitory, computer-readable storage media comprising a plurality of instructions stored thereon that, in response to execution, cause a computing device of a computing device social group to:
receive device attributes of a new computing device member of the computing device social group, wherein the device attributes define at least a physical characteristic of the new computing device member;
determine parameters of a social relationship with the new computing device member that is based on the device attributes, wherein the parameters define at least an amount of trust of the new computing device member by the computing device member;
determine a social interaction policy for the new computing device member based on the social relationship with the new computing device member, wherein the social interaction policy defines rules for interacting with computing devices that are already members of the computing device social group, wherein the local social interaction policy is different from the social interaction policy by at least a single rule;
transmit the determined social interaction policy to the new computing device member and the amount of trust;
determine whether to update the social relationship established with the new computing device member;
analyze, in response to a determination to update the social relationship, historical interactions with the new computing device member to determine a behavior of the new computing device member as a function of compliance with one or more rules defined by the social interaction policy; and
adjust the trust parameter of the social relationship with the new computing device based on the behavior.

23. The one or more non-transitory, computer-readable storage media of claim 22, wherein the device attributes (i) are usable to determine an amount of similarity between the computing device member and the another computing device member, (ii) comprise an attestation from a different computing device member of the computing device social group for the computing device member or the another computing device member, (iii) define a temporal persistency of the computing device member or the another computing device member with the computing device social group, or (iv) define historical interactions of the computing device member or the another computing device member with other computing device members of the computing device social group.

24. The one or more non-transitory, computer-readable storage media of claim 22, wherein the plurality of instructions further cause the computing device to:
  determine whether to update the social relationship established with the new computing device member;
  obtain, in response to a determination to update the social relationship, updated device attributes of the new computing device member, wherein the updated device attributes define at least a physical characteristic of the new computing device; and
  re-determine the parameters of the social relationship with the new computing device member based on the updated device attributes.

* * * * *